3,068,205
SYNERGISTIC CATALYST COMPOSITION CONTAINING A GROUP II METAL SALT AND AN ARSENIC COMPOUND FOR PREPARING CONDENSATION-TYPE POLYESTERS
James G. Smith, Kingsport, Tenn., assignor to Eastman Kodak Company, Rochester, N.Y., a corporation of New Jersey
No Drawing. Filed Oct. 27, 1958, Ser. No. 769,573
7 Claims. (Cl. 260—75)

This invention relates to a new combination of catalysts useful in preparing fiber and film-forming linear condensation-type polyesters of bifunctional dicarboxylic acids and bifunctional glycols, e.g. polyethylene terephthalate. The novel catalyst composition is composed essentially of a zinc (or equivalent) salt of a lower alkanoic acid (2 to 6 carbon atoms) such as zinc acetate and an arsenic compound containing no metal atoms in an amount such that there are from about 0.7 to about 5 atoms of zinc (or another group II metal such as Mg, Ca, Zn or Cd) for each atom of arsenic in the catalyst composition. Such catalysts are effective during the ester interchange reaction producing essentially monomeric esters of the acid and glycol and are unexpectedly highly effective during the subsequent polymerization.

The prior art to which this invention relates contains a great number of disclosures regarding the various methods of preparing fiber and film-forming linear condensation-type polyesters. A great number of polyesterification catalysts have been disclosed. One of the most basic patents relating to this field is U.S. 2,465,319 where a large number of ester interchange catalysts are listed as useful catalysts for the preparation of linear condensation-type polyesters starting with the bifunctional dicarboxylic acid in the form of a lower dialkyl ester. This patent mentions the use of zinc compounds as catalysts. A number of other patents mention the use of zinc acetate and other zinc salts of lower alkanoic acids as catalysts, e.g. Br. 753,880 wherein the alkanoic acid is preferably one containing from 2 to 6 carbon atoms. This same prior art discloses that combinations of catalysts can be employed to produce improved results in some instances. However, it is apparent from a consideration of the prior art that no predictions are possible as to what improvements can be obtained.

Among numerous useful catalysts for preparing polyesters beginning with a dialkyl ester of a bifunctional dicarboxylic acid and a glycol are borates such as zinc borate; oxides such as antimony trioxide, lead oxides, calcium oxide, etc.; alkoxides such as titanium isopropoxide, lithium ethoxide, etc.; halides such as neodymium bromide, cerium chloride, titanium fluoride, etc.; various metal alkyls such as aluminum triethyl, zinc dibutyl, cadmium dihexyl, lead tetraethyl, etc.; lower alkanoic acid esters such as zinc acetate, cobaltous acetate, zinc propionate, manganese formate, cadmium acetate, etc.; free metals such as magnesium, ruthenium, sodium, lithium, calcium, etc.; metal hydrides such as lithium hydride, lithium aluminum hydride, etc. Moreover, combinations of two or more of such catalysts sometimes produce unexpected results including synergistic activity. For example, a ternary mixture of various proportions of zinc acetate, antimony trioxide and lithium ethoxide catalyzes both initial ester interchange and subsequent polymerization at good rates, especially when using the powder build-up technique, to give polyethylene terephthalate or other polyesters having highly desirable properties. As another example, similar results can be achieved with binary mixtures of zinc borate and antimony trioxide. These various mixtures containing antimony trioxide are particularly advantageous during the powder build-up phase since antimony trioxide is especially effective in the temperature range generally used for such a build-up. Further examples of mixed catalytic compositions include the combination of zinc acetate with rare earth metal fluorides and the combination of magnesium metal or iodide with free iodine. Other combinations can be created as in bimetallic complex compounds such as zinc fluotitanate. However, in no event is it ever possible to predetermine what results will be achieved until after the catalytic composition has been actually used. This lack of predictability is one of the grounds upon which the present invention is founded. Some of the other exemplary catalytic combinations have been or are yet to be covered by applications of coworkers in this field. Of course, the patented art shows that a few combinations of this type have been known heretofore.

One of the most crucial problems in selecting catalysts for use in preparing polyesters is the avoidance of color and cloudiness in the polyester being produced. This is especially crucial in the case of those polyesters to be used to form a support or film base for photographic emulsions (either color or black and white) where the optical requirements are such that a substantially colorless and clear polyester is of great importance. Among the few catalysts which have been used in the preparation of polyesters suitable for use in making photographic film supports are the lower alkanoic acid esters of zinc. However, these catalysts have rather slow effects during the latter phases of the polyesterification reaction.

An unusual effect which can be achieved by suitable selection of the catalyst in preparing polyesters for use as photographic film supports is the purposeful selection of a catalytic composition which will produce a colored polyester which in the form of a film support will shift or broaden the maximum absorption of light. Thus a cine-negative support when appropriately tinted will require no separate antihalation coating. Moreover, a tinted cine film base will be less susceptible to edge fogging when stored in rolls where light may enter the edges of the rolled up film under some circumstances. A suitable catalyst to achieve such results is cobaltous acetate (film has light lavender coloration). Other catalytic compounds which originally are or can form colored products can be similarly employed. Binary or ternary catalytic compositions can be used whereby catalytic compounds which form differently colored products either cancel or enhance the coloration caused by the other binary or ternary components. If desired, nearly neutral coloration can be achieved by this latter technique; for example, using cobaltous acetate and zinc acetate as a binary catalyst produces a neutral color; similar results are achieved using cobaltous acetate and manganese formate produces a lavender colored polyester. These considerations illustrate the difficulties associated with selecting useful catalysts, especially for use as photographic film base. For most purposes it is extremely desirable to have a substantially colorless film base.

It is an object of this invention to provide a new combination of catalysts useful for preparing fiber and film-forming linear condensation-type polyesters which are substantially colorless, clear, and useful as photographic film base for black and white or color-type emulsions. The term colorless applies to the polyester melt and to films and other shaped articles; such a colorless polyester in fiber form will usually appear white.

It is an additional object of this invention to provide such catalysts which are more active than the lower alkanoic acid esters of zinc or the like so that polyesters of the desired intrinsic viscosity can be produced in a substantially shorter period of time.

It is another object of this invention to provide a process for preparing linear condensation-type polyesters using a catalytic composition which is effective at rather low concentrations and yet produces reasonably rapid reactions at all stages of the preparation of polyesters being formed from the condensation of the lower dialkyl ester of a bifunctional dicarboxylic acid with a bifunctional glycol.

Other objects will become apparent elsewhere herein.

According to a preferred embodiment of this invention there is provided a catalytic composition useful in preparing condensation-type linear polyesters from a dialkyl ester of a bifunctional dicarboxylic acid and a bifunctional glycol composed essentially of a zinc lower alkanoate and an arsenic compound in an amount such that there are from about 0.7 to about 5 atoms of zinc for each atom of arsenic in the catalytic composition.

The arsenic compounds incompassed within the scope of this invention include arsenic trioxide, arsenic pentoxide, arsenic nitrate, arsenic fluoride, arsenic bromide, arsenic chloride, arsenic iodide, and other trivalent and pentavalent colorless compounds of arsenic such as the various acids containing arsenic.

There is no reason in this specification to indulge in an extensive elaboration of the various processes which can be employed in preparing polyesters. U.S. Patent 2,465,319 and many subsequently issued patents such as U.S. 2,727,881 describe such processes in great detail. A common feature of all of the processes with which this invention is concerned is that they begin with a lower dialkyl ester of a bifunctional dicarboxylic acid which is condensed with a bifunctional glycol, the glycol usually being used as such although it can be used in the form of lower alkanoic acid ester thereof, such esters being equivalents of the glycol. The processes with which this invention is concerned involve the initial preparation in the presence of a catalyst of a substantially monomeric protopolymer under conditions facilitating removal of the lower alkanol formed from said lower dialkyl ester by ester interchange with said glycol. This is sometimes referred to as the first stage of the polyester preparation and can be conducted under a variety of conditions using many different types of apparatus. For example, the lower dialkyl ester and the glycol in a mol ratio beginning at about 1 to 1.5 up to 1 to 2.5 can be placed in a reaction vessel equipped with a packed column with the vessel being heated at a temperature which permits the lower alkanol to pass through the column with the glycol being retained by the column and returned to the reaction vessel whereby substantially all of the lower alkanol which can theoretically be produced is removed during this first stage of the polyester preparation which results in a monomeric protopolymer.

The second stage of the polyester prepration involves taking the monomeric protopolymer produced during the first stage and causing such protopolymer molecules to undergo a further ester interchange reaction whereby the superfluous quantities of glycol are removed and long chain polyester molecules are produced. The polymerization of the protopolymer is accomplished under conditions facilitating removal of superfluous quantities of said glycol so that the ultimate ratio of bifunctional dicarboxylic acid moieties to glycol moieties is essentially one to one in the polymer molecule.

The degree of polymerization is proportionate to the intrinsic viscosity of the polyester. A convenient solvent for measuring the intrinsic viscosity is a mixture of 60% phenol and 40% tetrachloroethane or carbon tetrachloride. The intrinsic viscosity for different polyesters does not necessarily represent the same molecular weight. The highly polymeric polyesters contemplated by this invention correspond to an intrinsic viscosity of at least 0.5 for polyethylene terephthalate. Other polyesters having the same molecular weight (12,000–13,000 or higher) may have higher or lower intrinsic viscosities indicative of said minimum molecular weight. As a broad generalization it is desired that the polyesters especially useful for preparing fibers and film have an intrinsic viscosity of about 0.55 or higher.

The polymerization of the protopolymer is generally accomplished during the earlier phases by heating at a temperature above the boiling point of the glycol at whatever pressure is used so that the glycol which is readily removable can be removed by a suitable condenser or other device attached to the reaction vessel. The pressure during this operation is generally atmospheric pressure or greater since lower pressures may produce excessive frothing or other conditions impeding the operation. As the readily removable amounts of the glycol are removed, the temperature is generally raised and the pressure is generally reduced either in increments or gradually so as to eventually result in temperatures from 10 to 100° C. above the boiling point of the glycol and pressures of no more than about 50 mm. of Hg pressure. Advantageously the pressure is as low as the available apparatus can produce, e.g. pressures on the order of from 1 mm. down to a few microns of Hg pressure. There is nothing critical about the temperatures or pressures although it is well recognized that excessively high temperatures will cause discoloration as a result of degradation of products whereas the use of low temperatures especially in combination with relatively high pressures (several centimeters of Hg pressure) will necessitate longer reaction periods which contribute toward discoloration. It is therefore advantageous that the pressure be less than 1 cm. of Hg pressure and the temperature generally be no more than about 75° C. above the boiling point of the glycol.

One of the processes which can be advantageously employed in the preparation of polyesters is the solid-phase polymerization process also called the powder buildup process. Such a process involves stopping the last stage of the polymerization at a point where the intrinsic viscosity of the polymer (which can be called a prepolymer) is from about 0.2 to about 0.45 using the methods generally described hereinabove, comminuting the prepolymer to form particles which will preferably pass through a 20 mesh screen, and then heating these particles in a vacuum or under an inert circulating atmosphere at a temperature from about 10° to about 60° C. below the melting point of the polyester. The prepolymer particles are advantageously agitated and not allowed to get sufficiently hot that they fuse together. Such a powder buildup process is advantageous when a high intrinsic viscosity is desired and no appreciable coloration of the polyester can be tolerated.

As already mentioned, the prior art contains a great number of disclosures of processes which can be employed and this invention is concerned primarily with the catalytic composition employed in accomplishing such processes.

A further embodiment of this invention provides a process for preparing a highly polymeric condensation-type linear polyester by condensing a lower dialkyl (1 to 4 carbon atoms) ester of a bifunctional dicarboxylic acid (at least 50% aromatic acid having from 8 to 20 carbon atoms) with a bifunctional glycol (2 to 10 carbon atoms) by first preparing in the presence of a catalyst a substantially monomeric protopolymer under conditions facilitating removal of the lower alkanol formed from said lower dialkyl ester by ester interchange with said glycol and then polymerizing said protopolymer in the presence of a catalyst under conditions facilitating removal of superfluous quantities of said glycol, the improvement consisting of using said catalyst in a concentration of from 0.001% to 0.1% based on the weight of said lower dialkyl ester, said catalyst being essentially composed of a lower alkanoate salt of a group II (periodic table) metal selected from the group consisting of magnesium, calcium, zinc and cadmium, the alkanoate radicals containing from 2 to 6 carbon atoms, and an arsenic compound selected from the group consisting of the oxides, acids, halides and nitrates of trivalent and pentavalent arsenic, the proportions being such that there are from about 0.7 to 5 atoms of said group II metal for each atom of arsenic, whereby a colorless, clear highly polymeric polyester can be prepared in less time than when either of said catalytic components is used by itself in the same total concentration.

Arsenic compounds containing no metal atoms such as arsenic pentoxide, etc., have no significant activity during the ester interchange although compounds such as barium arsenate can be employed. Quite surprisingly, this invention demonstrates that zinc acetate or a related group II metal salt can be used in conjunction with an arsenic compound containing no metal atoms in low concentrations to give substantially colorless and clear polyesters within a reaction period considerably less than that necessary to achieve a desirable I.V. using the zinc salt by itself in the same total concentration. The use of a single compound such as zinc arsenate does not produce results equivalent to the achievements of this invention which are accomplished by the presence of two separate compounds as described.

Since one of the most effective groups of catalysts shown in the prior art is illustrated by U.S. Patent 2,727,881, which describes the use of titanium catalysts and various processes which have been referred to in more general terms hereinabove, a comparison is presented below to aid in establishing the unobvious improvement provided by this invention. One of the difficulties associated with the use of titanium compounds such as the alkoxides is that the polyesters produced by those processes ordinarily employed have undesirable color characteristics. Another disadvantage of these catalysts is their ease of hydrolysis in the presence of moisture which tends to inactivate their catalytic behavior. It was therefore a valuable discovery to find that the catalytic compositions of this invention show good catalytic activity for both the ester interchange first phase of the preparation of the polyester and the subsequent polymerization phase of the preparation of the polyester.

This invention can be further illustrated by the following examples of preferred embodiments and comparative examples of the prior art although it will be understood that the examples of the invention are included merely for purposes of illustration and are not intended to limit the scope of the invention unless otherwise specifically indicated.

EXAMPLE 1

Fifty-eight and two-tenths grams of dimethyl terephthalate (0.3 mole), 37.2 g. of ethylene glycol (0.6 mole) and 0.6 ml. of a 9.6% solution of titanium tetrabutoxide in butanol were placed in a flask and heated under nitrogen with stirring at 185–190° C. Methanol evolved rapidly and the alcoholysis was complete in thirty minutes.

The temperature of the colorless residue was raised to 280–285° C. in forty to fifty minutes. The reaction mixture was then placed under reduced pressure (about 1 mm. of mercury) and the temperature held at 280–285° C. for thirty minutes. The melt viscosity increased rapidly and at the end of the thirty minutes, the vacuum was released with nitrogen.

The inherent viscosity (60:40 phenol:carbon tetrachloride) was found to be 0.65, but the color of the polymer was a deep yellow.

As can be seen from Example 1, which is illustrative of results obtainable according to the prior art, titanium tetrabutoxide using the normal melt polymerization process commonly employed in accordance with the prior art results in the formation of a polyester of good intrinsic viscosity but poor color. The following Example 2 will illustrate the results achieved using one of the best of the prior art catalysts insofar as freedom from discoloration is concerned.

EXAMPLE 2

The procedure described in Example 1 was repeated except the titanium tetrabutoxide was replaced with 1.0 ml. of a solution of 4.39 g. zinc acetate dihydrate dissolved in 100 ml. of ethylene glycol.

The final reaction product was heated at 280° C. at 1 mm. pressure for one hour. The polymer was very pale yellow in color and had an inherent viscosity of 0.32.

As can be seen from Example 2 it is necessary to employ longer reaction time when zinc acetate is employed as a catalyst. Moreover, in order to increase the intrinsic viscosity it is necessary to employ even more zinc acetate than illustrated in Example 2 over longer periods of time with consequent deterioration of color.

The following example will illustrate that arsenic compounds in themselves are of no value as catalysts for polyesterification.

EXAMPLE 3

A mixture of 58.2 g. (0.3 mole) of dimethyl terephthalate, 37.2 g. (0.6 mole) of ethylene glycol, and 0.023 g. ($1 \times 10^{-4}$) mole or arsenic pentoxide was placed in a flask and heated under nitrogen with stirring at 180–190° C. for ninety minutes. During this time no methanol was evolved. This fact indicated that the alcoholysis reaction, if it was proceeding at all, was very slow.

Although arsenic pentoxide and other arsenic compounds are of no value by themselves as polyesterification catalysts, the combination of such an arsenic compound with zinc acetate or its equivalent using a process such as that illustrated by Example 2 constitutes the unobvious discovery with which this invention is concerned. The following examples illustrate this invention in some of its aspects.

EXAMPLE 4

A mixture of 58.2 g. (0.3 mole) of dimethyl terephthalate, 37.2 g. (0.6 mole) of ethylene glycol, 0.023 g. ($1 \times 10^{-4}$ mole) of arsenic pentoxide and 0.8 ml. ($2 \times 10^{-4}$ moles) of the zinc acetate solution described in Example 2 were placed in a flask. The mixture was heated at 190–195° C. under nitrogen with stirring. The theoretical amount of methanol was evolved in forty minutes.

The temperature was then rapidly raised to 275–280° C., the pressure reduced to less than 1 mm. of mercury, and the melt stirred under vacuum for sixty minutes. The polymer was almost colorless and had an inherent viscosity of 0.63.

The following table summarizes some examples in which the amounts of zinc acetate and arsenic pentoxide are varied. Example 4 is repeated for the sake of comparison. The quantities of reagents used (except catalysts) and conditions are the same as in Example 4.

*Table*

| Example | Catalyst | Moles $\times 10^{-4}$ | Ratio of Atoms of Zinc to Atoms of Arsenic | Polymer Viscosity (I.V.) | Color |
|---|---|---|---|---|---|
| 4 | Zn(OAc)$_2$<br>As$_2$O$_5$ | 2.0<br>1.0 | 1.0 | 0.63 | Excellent (substantially colorless). |
| 5 | Zn(OAc)$_2$<br>As$_2$O$_5$ | 2.0<br>2.0 | 0.5 | 0.56 | Fair. |
| 6 | Zn(OAc)$_2$<br>As$_2$O$_5$ | 2.0<br>0.5 | 2.0 | 0.40 | Good. |
| 7 | Zn(OAc)$_2$<br>As$_2$O$_5$ | 2.0<br>0.25 | 4.0 | 0.28 | Good. |

As can be seen by Examples 4–7, the ratio of atoms of zinc to atoms of arsenic should be considerably greater than 0.5 and should preferably be about one or more. The preferred range appears to be from about 1 to about 5 although somewhat less than 1 and somewhat more than 5 atoms of zinc for each atom of arsenic can be present in the catalytic composition. For some purposes where polyester moldings containing pigments of deep colors are to be the end product, there is no reason why the ratio of atoms of zinc to atoms of arsenic cannot be 0.5 since a polymer of high intrinsic viscosity can be readily achieved. As can be seen from the tabulation as compared to the data presented in Example 2, the presence of less and less arsenic in the catalytic composition (Examples 4–7) gives results closer and closer to that achieved in Example 2. It is to be noted that the amount of zinc present in Example 7 is less than that present in Example 2. Although the results achieved in Example 7 are substantially equivalent to those achieved in Example 2, other arsenic compounds and other total proportions of catalytic composition produce different results so that it is considered that the ratio of atoms of zinc to atoms of arsenic can advantageously extend to as high as 5. An especially preferred range of such ratios is from 0.8 to 1.4 atoms of zinc for each atom of arsenic.

The following example will serve to illustrate the practice of this invention using the so-called solid phase polymerization or powder buildup technique.

EXAMPLE 8

The procedure of Example 4 was repeated except that after holding the polymer under vacuum for 10 minutes, the low-molecular weight polyester (prepolymer) was covered with a nitrogen atmosphere and poured into water.

A dried sample was ground to pass a 60-mesh screen and heated at 240° C. and 0.1 mm. of mercury for three hours. The viscosity of the sample was now 0.77, and the color was white.

A prepolymer sample prepared by a similar modification of Example 1 was found to polymerize in a solid phase polymerization to a viscosity of 1.07. The color, however, was a tan shade.

Although the powder buildup process generally tends to reduce the extent of discoloration inherent in a given catalyst, the advantages of the present invention remain quite obvious.

EXAMPLE 9

The procedure described in Example 4 was repeated, but the arsenic pentoxide was replaced with arsenic trioxide (0.020 g., $1 \times 10^{-4}$ moles; atoms of zinc/atoms of arsenic=2.0).

After 60 minutes of heating under vacuum at 275–280° C., the melt was colorless and was found to have an inherent viscosity of 0.57.

EXAMPLE 10

The procedure described in Example 4 was repeated, but the arsenic pentoxide was replaced with arsenic trichloride ($2 \times 10^{-4}$ moles; atoms of zinc/atoms of arsenic=1.0). After 60 minutes of heating under vacuum at 275–280° C., the melt was colorlesss and had an inherent viscosity of about 0.6.

EXAMPLE 11

The procedure described in Example 10 was repeated, but the arsenic compound was replaced with arsenic trinitrate with results similar to that described in Example 10.

EXAMPLE 12

The procedure described in Example 10 was repeated except that the arsenic compound was ortho-arsenic acid. Similar results were obtained.

EXAMPLE 13

The procedure described in Example 10 was repeated except that the arsenic compound was meta-arsenic acid. Similar results were obtained.

EXAMPLE 14

The procedure described in Example 10 was repeated except that the arsenic compound was arsenic tri-iodide. Similar results were obtained.

EXAMPLE 15

The procedure described in Example 4 was repeated but the zinc acetate was replaced with $2 \times 10^{-4}$ moles of cadmium propionate (atoms of cadmium/atoms of arsenic=1.0). After 60 minutes of heating under vacuum at 275–280° C. the melt was colorless and had an inherent viscosity of about 0.55.

EXAMPLE 16

19.4 g. of dimethyl terephthalate (0.1 mole), 28.8 g. of cyclohexane-1,4-dimethanol (0.2 mole of what is between 65 and 70% trans isomer) and 0.4 ml. ($1 \times 10^{-4}$ moles) of a zinc acetate solution and 0.012 g. ($5 \times 10^{-5}$ moles) of arsenic pentoxide as described in Example 2 were placed in a flask and heated with stirring to 190–200° C. The ester interchange was rapid and as soon as the methanol had all distilled out of the reaction mixture the temperature was rapidly increased to about 270° C. The reaction mixture was then put under reduced pressure (about 1 mm. of Hg) and the temperature was raised to 300–310° C. over a period of 90 minutes. The reaction mixture became more viscous but remained colorless. The mixture was then let down to atmospheric pressure with notrogen and the resulting polymer removed. The resulting white opaque solid had a crystalline melting point of 290° C. and an inherent viscosity of about 0.8.

EXAMPLE 17

6.29 g. (0.015 mole) of dibutyl p,p′-sulfonyl dibenzoate, 3.14 g. (0.01 mole) of dibutyl sebacate, 7.2 g. (0.05 mole) of 1,4-cyclohexane dimethanol (60–65% trans isomer) and 0.08 ml. ($2 \times 10^{-5}$ moles) of zinc acetate solution described in Example 2 together with 0.0023 g. ($1 \times 10^{-5}$ moles) of arsenic pentoxide were placed in a reaction flask and the procedure decribed in Example 16 was carried out. A polyester was obtained with an inherent viscosity of 0.9. This polyester had a melting point of 245–250° C.

Any of the above polyesters can be used in the preparation of synthetic fibers. However, for utility in manufacture of fabrics suitable for wearing apparel it is generally considered that the inherent viscosity of the polyester should be at least 0.55. The same minimum inherent viscosity is needed when the polyester is to be used for the preparation of film which can be drafted, tentered and heat set so as to achieve its maximum properties for utility in film suitable for a wrapping material, an electric insulator, a photographic film base, etc. The polyesters described above in Examples 4, 8, 9 and 16 are especially valuable as photographic film base for either black-and-white or color type emulsions.

Other variations can be employed such as using magnesium butyrate, calcium hexanoate, zinc pentanoate, etc. in lieu of the zinc acetate or cadmium propionate of the examples set forth above. In like manner, other arsenic compounds can be employed such as arsenic trifluoride, arsenic tribromide, and numerous other trivalent and pentavalent arsenic compounds such as the various forms of the acids of arsenic, etc.

An especially preferred embodiment of this invention involves the combination of arsenic pentoxide or trioxide compounded with zinc acetate so that the ratio of atoms of zinc to atoms of arsenic is about 0.8 to about 1.4.

We have found that catalytic amounts of arsenic pentoxide or trioxide coupled with zinc acetate produces polyethylene terephthalate of superior viscosity and color than when zinc acetate is used alone.

Arsenic pentoxide or trioxide alone fails to promote the ester-interchange step of the polyester formation. Zinc acetate alone is an excellent catalyst for this ester-interchange step, but fails to produce a polyester of acceptable viscosity in a reasonable length of time.

The combination of zinc acetate and arsenic pentoxide or trioxide generates in a short length of time a high viscosity polyester with a color superior to that produced by zinc acetate alone. Thus, the combination of the two compounds is unexpectedly superior in several respects to either of the compounds alone.

The amount of zinc acetate used is such that the polyethylene terephthalate contains .005% to .05% zinc, preferably .01 to .03%. The amount of arsenic pentoxide or trioxide used is such that the polyethylene terephthalate contains .01 to .10% arsenic metal, preferably .03 to .06%. Best results are obtained when the ratio of zinc compound to arsenic compound is at least one atom of zinc to one atom of arsenic. That is, it is best to have more zinc atoms present in the reaction mixture than arsenic atoms.

The zinc acetate and arsenic pentoxide or trioxide may be added to the mixture of reagent as solids. However, it is usually more convenient to prepare solutions of known concentrations in ethylene glycol, and to measure the volume of solution required.

In addition to the particular catalysts described hereinabove, it is also possible to practice the invention in the presence of other catalysas such as lithium alkoxides, magnesium methoxide, magnesium titanium butoxide, etc. Of course, any such compounds which tend to increase the color should not be used unless the product is to be pigmented, dyed or otherwise used under circumstances where coloration is inconsequential. Although the group II metal alkanoates specified hereinabove are the preferred compounds, partial replacements may be made with the same metals in the form of oxides, carbonates or other colorless salts. For example either zinc oxide or zinc carbonate can be used in lieu of zinc acetate in most cases. However, zinc acetate is generally to be preferred since, among other reasons, it can be handled in a very efficacious manner in commercial operations.

Other polyesters can be produced in a manner analogous to that described in the preceding examples using the melt phase polymerization techniques described in the other examples or the powder buildup techniques described hereinabove. The vast number of reactants which can be used in the preparation of such polyesters is described in the prior art referred to above such as U.S. Patent 2,727,881.

The term "bifunctional" as used in this specification has the same meaning as it has in the numerous patents appearing in the prior art and as defined by Carothers in his early patents regarding the preparation of polyesters. Quite obviously the reactants must be bifunctional since otherwise the polyesters produced will not be linear. The term bifunctional excludes unsaturated reactants as well as reactants which contain other functional groups such as amino groups, isocyanate groups, etc.

The invention has been described in detail with particular reference to preferred embodiments thereof, but it will be understood that variations and modifications can be effected within the spirit and scope of the invention as described hereinabove and as defined in the appended claims.

I claim:

1. A processs for preparing a highly polymeric linear polyester comprising,
   (I) heating at an elevated temperature in the presence of a catalyst (1) a lower dialkyl ester of a bifunctional dicarboxylic acid which is predominantly composed of an aromatic acid containing from 1 to 2 benzene rings and from 8 to 20 carbon atoms and said alkyl radicals contain from 1 to 4 carbon atoms, and (2) a bifunctional glycol containing from 2 to 10 carbon atoms, said heating being under conditions facilitating removal of the lower alkanol formed from said lower dialkyl ester by ester exchange with said glycol, whereby a substantially monomeric protopolymer is formed, and
   (II) heating said protopolymer in the presence of said catalyst under conditions facilitating removal of superfluous quantities of said glycol whereby said highly polymeric linear polyester is formed,
   said catalyst being present in both of steps I and II in a concentration of from 0.001 percent to 0.1 percent based on the weight of said lower dialkyl ester, said catalyst being essentially composed of (1) a lower alkanoate salt of a metal selected from the group consisting of magnesium, calcium, zinc and cadmium, said alkanoate radicals containing from 2 to 6 carbon atoms, and (2) an inorganic arsenic compound selected from the group consisting of the oxides, acids, halides and nitrates of trivalent and pentavalent arsenic, the proportions being such that there are from about 0.7 to 5 atoms of said metal for each atom of arsenic, whereby a colorless, clear, highly polymeric polyester can be prepared in less time than when either of said catalytic components is used by itself in the same total concentration.

2. A process as defined by claim 1 wherein said salt of a metal is zinc acetate.

3. A process as defined by claim 1 wherein said arsenic compound is arsenic pentoxide.

4. A process as defined by claim 1 wherein said arsenic compound is arsenic trioxide.

5. A process as defined by claim 2 wherein there are from about 0.8 to about 1.4 atoms of zinc for each atom of arsenic.

6. A process as defined by claim 5 wherein said arsenic compound is arsenic pentoxide.

7. A process as defined by claim 5 wherein said arsenic compound is arsenic trioxide.

References Cited in the file of this patent

UNITED STATES PATENTS

| | | |
|---|---|---|
| 2,181,640 | Deanesly et al. | Nov. 28, 1939 |
| 2,525,144 | Mavity | Oct. 10, 1950 |
| 2,578,660 | Auspos | Dec. 18, 1951 |
| 2,641,592 | Hofrichter | June 9, 1953 |
| 2,831,819 | Schmidt | Apr. 22, 1958 |

FOREIGN PATENTS

| | | |
|---|---|---|
| 742,811 | Great Britain | Jan. 4, 1956 |